Sept. 6, 1966  W. J. SACKETT, SR  3,270,896
BULK BLENDING PLANT
Filed Sept. 3, 1964  2 Sheets-Sheet 1

INVENTOR
WALTER J. SACKETT, SR.
BY Walter G. Finch
ATTORNEY

Sept. 6, 1966 W. J. SACKETT, SR 3,270,896
BULK BLENDING PLANT
Filed Sept. 3, 1964 2 Sheets-Sheet 2

WALTER J. SACKETT, SR.
INVENTOR

BY Walter G. Finch
ATTORNEY

United States Patent Office 3,270,896
Patented Sept. 6, 1966

3,270,896
BULK BLENDING PLANT
Walter J. Sackett, Sr., 3700 Echodale Ave.
Baltimore, Md. 21206
Filed Sept. 3, 1964, Ser. No. 394,155
15 Claims. (Cl. 214—2)

This invention relates generally to bulk blending plants, and more particularly to mixing plants for compounding several granular materials into a formulated product.

In the manufacture of a mixed material product, such as feeds or fertilizers the handling of the various components to suit a multitude of desired blends can be very expensive. It is a principal object of this invention to provide an arrangement of handling machines and compounding apparatus for the most economical and rapid selection and transference of materials for the manufacture of a mixed granular product.

Another object of this invention is to provide a novel housing construction of low cost for a plant of this nature.

Still other objects and attendant advantages of this invention are to provide a novel mixing and blending plant for compounding and blending a plurality of granular materials into a formulated product which is economical to construct, easy to install and maintain, and which is efficient and reliable in operational use.

Figure 1:
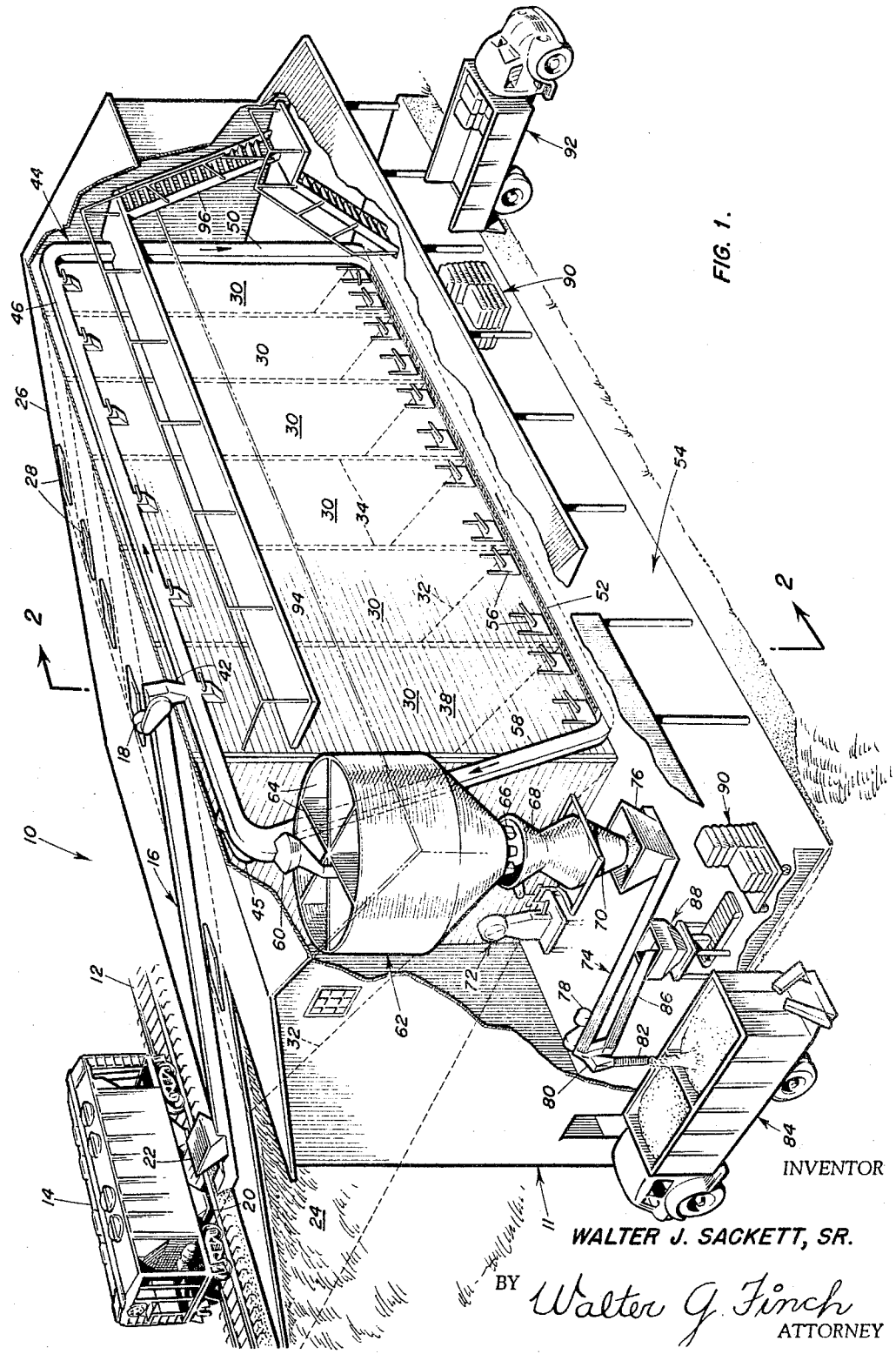
Figure 2:
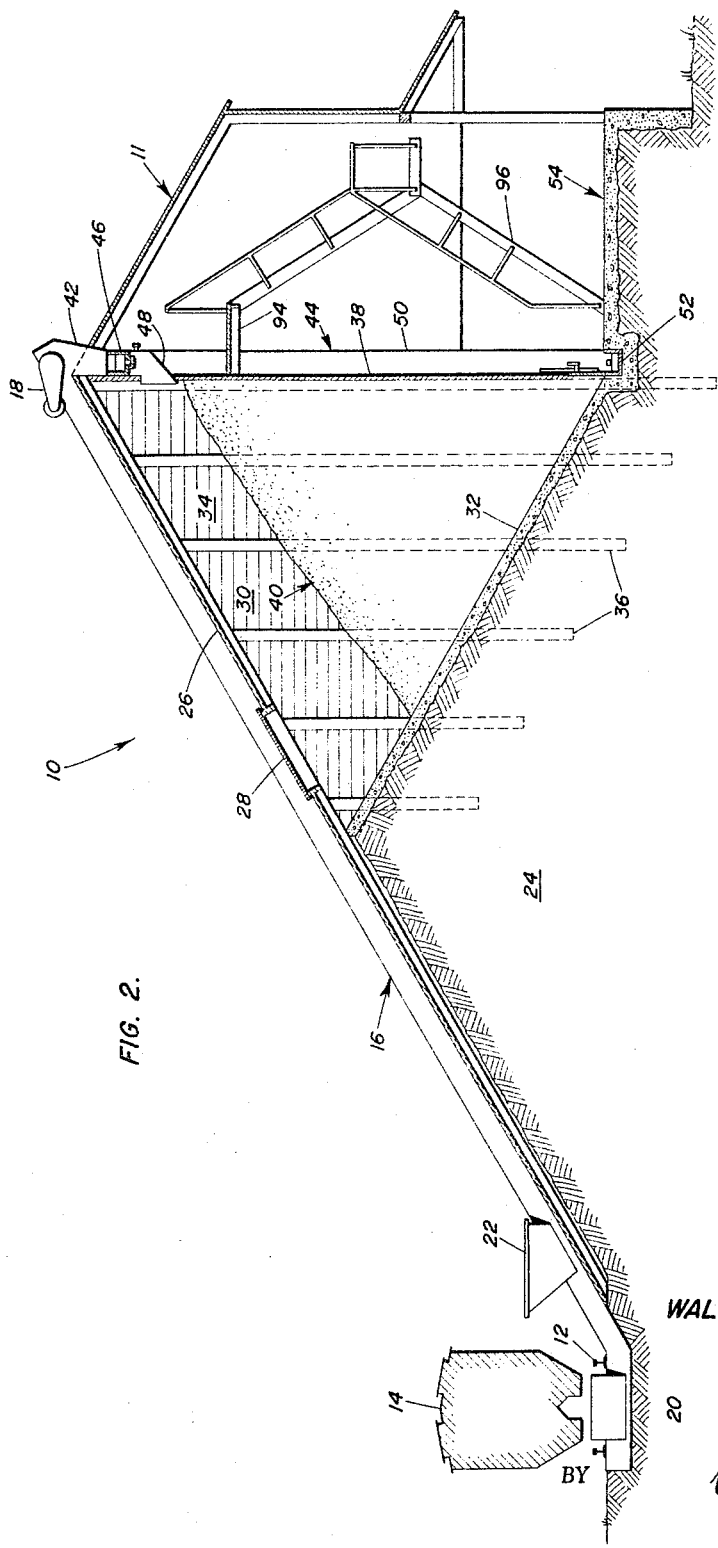

Other objects and attendant advantages of this invention will become more readily apparent and understood from the following detailed specification and accompanying drawings in which:

FIG. 1 is a perspective view of a novel bulk blending plant according to this invention shown broken away for clarity of detail; and FIG. 2 is a vertical section taken on line 2—2 of FIG. 1.

The plant to be described herein is built very inexpensively in that a mound of earth is utilized to cut the costs of construction materials and fabrication. Raw material for processing can be unloaded directly from railroad hopper or box cars by a conveyer system where it is elevated over the apex and there beyond dumped into selected storage bins by a second endless conveyer system which also defines a vertical periphery to the face of the plant. This second conveyer system is further utilized to selectively pick up materials from these component storage bins which empty by gravity due to their novel construction on the near slope of the mound.

The selected materials are then elevated by the same peripheral endless conveyer system to a blending machine and thence dispensed as a mixed product either in bulk or bagged.

Referring now to the details of the drawings as shown in FIGS. 1 and 2, reference numeral 10 designates generally a bulk blending plant incorporating features of this invention. This plant 10 comprises a relatively inexpensive housing 11 located near a railway siding 12.

Here, hopper cars 14 (or box cars) can be quickly unloaded by means of a receiving conveyer system 16 having a motor drive 18. This conveyer system 16 has a "between tracks" receiving box 20 for gathering the raw material from the hopper car 14 as well as an elevated receiving box 22 for gathering it from box car shipments.

The receiving conveyer system 16 is supported upon the far side of an elongated earthen mound 24 (natural terrain or graded up from any excavation required for the plant housing 11) and extends beyond the mound apex upon a main roof 26 housing of the same or substantially the same slope.

Access hatches or doors 28 may be provided in the roof at spaced intervals as shown to a plurality of storage bins 30 located therebelow. These storage bins 30 are constructed on the near slope of the mound 24 with floors 32 of concrete conforming thereto.

The dividing walls 34 of the storage bins 30 as well as the main roof 26 are supported on vertical posts or columns 36 set into the mound 24. The fronts of storage bins 30 have a common vertical main front wall 38 which confines the stored material 40 in a sort of hopper arrangement as best shown in FIG. 2.

Material is introduced to the storage bins 30 at their tops, selectively, in the following manner. A short gravity chute 42 extends downwardly from the top end of the receiving conveyer system 16 and discharges into a main conveyer system designated generally by reference numeral 44. This endless conveyer system 44, driven by a motor drive 45, and having sections 46, 50, 52 and 58 defines generally in a vertical plane the periphery of the main front wall 38. The conveyer system 44 is of the paddle type pushing material along the bottom of a trough or conduit.

The material from the receiving conveyer discharge chute 42 is propelled by the upper horizontal section 46 of the main conveyer system 44 in the direction of the arrow across a series of drop gates 48. These drop gates 48 are accessible by means of a catwalk 94 and stairs 96. If one of these drop gates 48 is opened, the material drops into the associated bin 30 for storage. Optionally the material may continue onward for immediate processing instead of into the right hand vertical section 50.

The lower horizontal section 52 of conveyer system 44 is open topped and recessed into the platform 54 of the plant. It extends before a series of discharge gates 56 in the main front wall 38. These are provided in pairs for each bin 30 to avoid accumulation in the corners should a bin be required to be completely emptied.

Selected material from these gates 56 is carried in the direction of the arrow by the lower horizontal conveyer section 52 and thence steeply upward on an inclined section 58. The material discharges near the top into a rotatable compartment selector 60 of a compounding hopper 62 where the ingredients of a batch are distributed into respective compartments 64. The now empty conveyer section 58 continues around to join the upper horizontal section 46.

The compartments 64 of the compounding hopper 62 are each provided with a gate valve 66 all opening commonly into a discharge centering funnel 68. This funnel 68 causes the material to impinge upon multiple distributing cones of a weigh-blend hopper 70.

Each ingredient of the material is weighed out on a dial reading scale 72 associated with the hopper 70 and when the formula is complete it is manually or automatically dumped, blending as it falls into a receiving hopper 76 of a final conveyer system 74.

This conveyer system 74, driven by a motor drive 78, carries the product to a split discharge gate 80 where it is directed either by a bulk delivery spout 82 to a spreader truck 84 or by a gravity chute 86 to a bagging machine 88. The bagged product 90 may be stored on the platform 54 for ultimate delivery to a truck 92.

Obviously many modifications and variations of the present invention are possible in light of the above teachings. It is, therefore, to be understood that within the scope of the appended claims the invention may be practiced otherwise than as specifically described.

What is claimed is:

1. A bulk blending plant, comprising, a prismatic base structure having two of its sides defining a rear materials elevating slope and a forward materials discharging slope, a wall structure extending upwardly from the lowermost edge of said forward materials discharging slope to define a materials storage chamber with said forward materials discharging slope, means for dividing said materials storage chamber into a plurality of materials receiving storage bins, with said wall structure having receiving and discharging apertures provided therein for each said storage bin at its uppermost and lowermost portions, respectively, first means for elevating materials for storage in said storage bins, second means for receiving said elevated materials from said elevating means and for distributing selectively said elevated materials through said receiving apertures to said plurality of storage bins and for selectively receiving said plurality of stored materials discharged through said discharging apertures in said wall structure, with said second means distributing, receiving, and elevating said materials simultaneously, means including an elevated compartmentized hopper for receiving said discharged selected materials from said second means to be blended together, means for selectively weighing selected compartmentized materials, and means for discharging and blending said weighed materials for further ultimate use.

2. A bulk blending plant as recited in claim 1, wherein said first means discharges into said second means at a fixed point.

3. A bulk blending plant as recited in claim 1, wherein said second means is an endless conveyer system arranged generally around the periphery of said wall structure and arranged to communicate with said receiving and discharged apertures for said storage bins.

4. A bulk blending plant as recited in claim 3, where said endless conveyer system is of a paddle and trough type and is provided with drop gates for said receiving apertures to discharge said materials to selected storage bins.

5. A bulk blending plant, comprising, a prismatic base structure having two of its sides defining a rear materials elevating slope and a forward materials discharging slope, building structure adjacent said prismatic base structure and having a roof extending over said forward materials discharging slope and co-planar with said rear materials elevating slope of said base, a wall structure extending upwardly toward said roof from the lowermost edge of said forward materials discharging slope to define a materials storage chamber with said forward materials discharging slope and said roof, means for dividing said materials storage chamber into a plurality of materials receiving storage bins, with said wall structure having receiving and discharging apertures provided therein for each said storage bin at its uppermost and lowermost portions, respectively, first means solely supported by said roof and rear materials elevating slope of said base for elevating materials for storage in said storage bins, second means for receiving said elevated materials from said elevating means and for distributing selectively said elevated materials through said receiving apertures to said plurality of storage bins and for selectively receiving said plurality of stored materials discharged through said discharging apertures in said perpendicular wall structure, with said second means distributing, receiving, and elevating said materials simultaneously, means including an elevated compartmentized hopper for receiving said discharged selected materials from said second means to be blended together, means for selectively weighing selected compartmentized materials, and means for discharging and blending said weighed materials for further ultimate use.

6. A bulk blending plant as recited in claim 5, wherein said first means discharges into said second means at a fixed point.

7. A bulk blending plant as recited in claim 5, wherein said second means is an endless conveyer system arranged generally around the periphery of said wall structure and arranged to communicate with said receiving and discharged apertures for said storage bins.

8. A bulk blending plant as recited in claim 7, where said endless conveyer system is of a paddle and trough type and provided with drop gates for said receiving apertures to discharge said materials to selected storage bins.

9. A bulk blending plant, comprising, a prismatic base structure formed of a dirt mound covered with a hard substance and having two of its sides defining a rear materials elevating slope and a forward materials discharging slope, a generally perpendicular wall structure extending upwardly from the lowermost edge of said forward materials discharging slope to define a materials storage chamber with said forward materials discharging slope, means for dividing said materials storage chamber into a plurality of materials receiving storage bins, with said perpendicular wall structure having receiving and discharging apertures provided therein for each said storage bin at its uppermost and lowermost portions, respectively, first conveyor means for elevating materials for storage in said storage bins, second conveyor means for receiving said elevated materials from said elevating means and for distributing selectively said elevated materials through said receiving apertures to said plurality of storage bins and for selectively receiving said plurality of stored materials discharged through said discharging apertures in said perpendicular wall structure, with said second means distributing, receiving, and elevating said materials simultaneously, means including an elevated compartmentized hopper for receiving said discharged selected materials from said second conveyor means to be blended together, means for selectively weighting selected compartmentized materials, and means for discharging and blending said weighed materials for further ultimate use.

10. A bulk blending plant as recited in claim 9, wherein said first conveyor means discharges into said second conveyor means at a fixed point.

11. A bulk blending plant as recited in claim 9, wherein said second conveyor means is an endless conveyer system arranged generally around the periphery of said wall structure and arranged to communicate with said receiving and discharged apertures for said storage bins.

12. A bulk blending plant as recited in claim 11, wherein said endless conveyer system is of a paddle and trough type and provided with drop gates for said receiving apertures to discharge said materials to selected storage bins.

13. A bulk blending plant, comprising, a prismatic base structure formed of a filling material covered with a hard surface and having two of its sides of substantially equal area and defining a rear materials elevating slope and a forward materials discharging slope, building structure adjacent said prismatic base structure and having a roof extending over said forward materials discharging slope and co-planar with said rear materials elevating slope of said prismatic base, a generally perpendicular wall structure extending upwardly toward said roof from the lowermost edge of said forward materials discharging slope to define a materials storage chamber with said forward materials discharging slope and said roof, means for dividing said materials storage chamber into a plurality of materials receiving storage bins, with said perpendicular wall structure having receiving and discharging apertures provided therein for each said storage bin in its uppermost and lowermost portions, respectively, first conveyor means for elevating materials for storage in said storage bins, second conveyor means solely supported by said roof structure and said materials elevating slope of said base for receiving said elevated materials from said elevating means and for distributing selectively said elevated materials through said receiving apertures to said plurality of storage bins and for selectively receiving said plurality of storage materials discharged through said discharging apertures in said perpendicular wall, with said second conveyor means distributing, receiving, and elevating said selected materials simultaneously, means including an elevated compartmentized hopper for receiving said discharged selected materials from said second conveyor means to be blended together, means for selectively weighing selected compartmentized materials, and means for discharging and blending said weighed materials for further ultimate use.

14. A bulk blending plant as recited in claim 13, wherein said second conveyor means an endless conveyer system arranged generally around the periphery of said wall structure and arranged to communicate with said receiving and discharged apertures for said storage bins.

15. A bulk blending plant as recited in claim 14, where said endless conveyer system is of a paddle and trough type and provided with drop gates for said receiving apertures to discharge said materials to selected storage bins.

References Cited by the Examiner

UNITED STATES PATENTS

| | | | |
|---|---|---|---|
| 760,189 | 5/1904 | Gaines et al. | 214—2 |
| 1,682,872 | 9/1928 | Venable | 214—2 |
| 2,003,417 | 6/1935 | Andreas | 214—17 |
| 3,170,677 | 2/1965 | Phister et al. | 259—154 |

MARVIN A. CHAMPION, *Primary Examiner.*